Feb. 2, 1937.   F. S. DE LA TOUR   2,069,647
SYSTEM OF SCULPTURAL REPRODUCTION IN THREE DIMENSIONS
BY MEANS OF INSTANTANEOUS PHOTOGRAPHY
Filed March 25, 1935
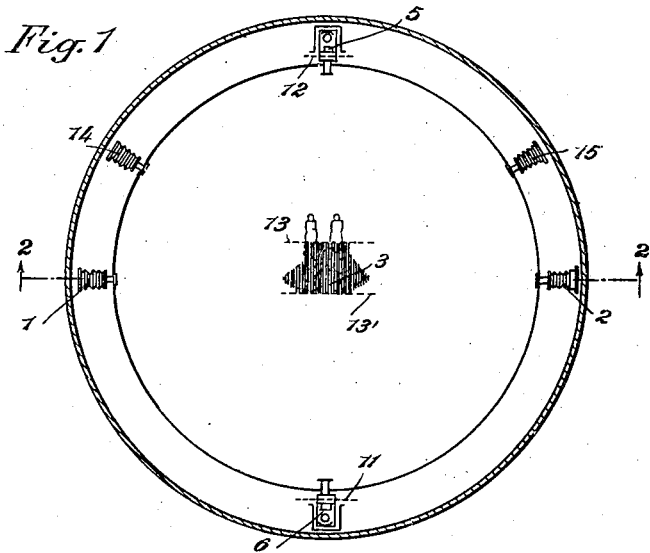
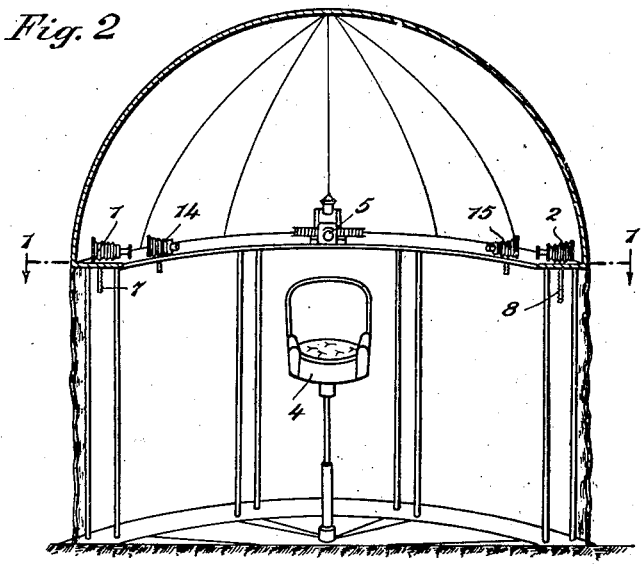
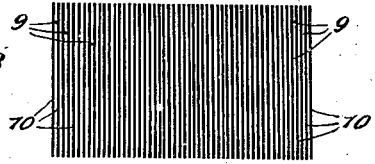
Filiberto Sallier de la Tour
INVENTOR
his ATTY.

Patented Feb. 2, 1937

2,069,647

UNITED STATES PATENT OFFICE 2,069,647

SYSTEM OF SCULPTURAL REPRODUCTION IN THREE DIMENSIONS BY MEANS OF INSTANTANEOUS PHOTOGRAPHY

Filiberto Sallièr de La Tour, Palermo, Italy

Application March 25, 1935, Serial No. 12,914
In Italy March 24, 1934

13 Claims. (Cl. 41—25)

(Granted under the provisions of sec. 14, act of March 2, 1927; 357 O. G. 5)

My present invention has for its object to provide a system of sculptural reproduction of persons, animals or objects by means of photography, and in particular by means of a plurality of photographs taken simultaneously and instantaneously.

My present invention permits of sculptural reproduction of an object, such as a person (full size or bust) by only taking two photograms, and also the easy and exact reproduction, magnified or reduced, of existing sculptural figures.

It is known that there are other systems of photographic sculptural reproduction, so-called systems of sculptography, by which in successive minimal periods (tempuscula) the various profiles are taken, for instance a human face, which form certain determined angles between each other. It may be said that according to these systems of sculptography a polar relief of the solid object to be reproduced is taken.

The main principal disadvantage of these known systems resides in the fact that the profiles taken do not represent exposures taken simultaneously, but require a certain time interval of approximately 4-5 seconds between successive exposures.

Another serious disadvantage is in the fact that the subject matter or object to be reproduced is mounted on a rotatable platform, and consequently a special photographic apparatus is required, such as a cinematographic machine or other known device for the advancement of sensitive material.

To use these methods therefore the sculptographic plant will represent a rather expensive outlay, and its operation will require special technicalities.

According to my present invention the disadvantages outlined above will be removed because it is the purpose of my invention that the object to be reproduced be photographed but once, and simultaneously, by two suitably placed machines, while parallel lines of illumination are projected upon the object through a screen by means of suitably placed projectors or by solar light. It is preferred that the cameras and projectors be arranged in pairs, with the cameras facing each other in diametrically opposite positions and each projector likewise arranged, at right angles to the cameras, but all having their lens axes in the same plane.

The fact that the taking is effected by instantaneous or snap shot photography permits of faithfully reproducing fleeting aspects of live or moving subjects. For instance a person or horse in motion may be photographically recorded and sculpturally reproduced by suitably arranging the devices in a manner which will be described hereinafter.

In order to make my present invention better understood it has been illustrated by way of example in the annexed drawing in which:

Fig. 1 shows in horizontal section (on line I—I of Fig. 2) a sculptographic recording studio or laboratory to which our present invention has been applied, Fig. 2 is a section on line 2—2 of Fig. 1, with portions shown in perspective, Fig. 3 is a diagram of a screen to be used for the purposes of our invention.

In these figures in which like reference characters indicate like parts, two diametrically opposed photographic machines I and 2 are focussed on the same subject 3 placed at the centre of the studio, for instance on an easy chair 4, the studio being dark or nearly dark. The subject 3 is illuminated from the front and the back by two projectors 5 and 6 directing a series of parallel luminous lines on the subject, as will be better explained hereinafter. The studio may comprise a fixed room, or a transportable dark chamber, such as indicated in the drawing. It should be mentioned that at this point a closed and dark laboratory is only necessary when the operator works with artificial light, whilst when operating in sun light the dark chamber may be dispensed with and it will be sufficient for the purpose to interpose between the sun and the subject to be reproduced a screen with dark lines alternated with transparent lines, such as illustrated by way of example in Fig. 3. It is preferred that the dark lines of the screen have a width which is a multiple of that of the transparent ones, 10.

The lined screen may be placed for instance at 11 and 12 in the very projection machines, or at a short distance from the face and the back of the subject, such as indicated at 13 and 13' in Fig. 1. In either case it is necessary that the luminous plans incident on the face of the subject or object to be reproduced shall be parallel to each other.

In order to attain this purpose the projecting machines 5 and 6 may be provided with lenses or reflectors capable of generating a series of parallel beams or a series of solar beams may be utilized and directed on the object to be reproduced through the said lined screen (13 and 13').

To make it possible that a series of solar rays may strike the subject placed in the studio in a convenient way, a system of reflectors or any other suitable optical system may be used or one may operate in open air, as indicated above.

The luminous lines may be distant from each other, in practice, from one to five millimeters, but it is understood that these figures are only given for purely illustrative purposes, there being no fixed limits in the choice of the distance between the parallel luminous lines, the said distance depending upon the size of the subject or object, and upon the details intended to be reproduced. Each luminous line comprises a sheet of light proper, the thickness of which may vary from a fraction of millimeter to one or more millimeters, and beyond.

If, for instance, the luminous lines have a thickness of mm. 25, and the distance between the luminous lines is of mm. 2,5, about 60 luminous lines will fall on the face of a person, that means about 60 lines of intersection between the facial surface and the above said lines.

When, with the arrangement shown in Fig. 1, a photograph by either of the machines 1 and 2 is taken, each photograph will record 30 profiles or 30 lines of intersection for the front part of the face, and a like number of profiles for the back part.

The projecting machines 5 and 6 or the lined screens 13 and 13', respectively, are so placed that the series of lines coming from a given projecting machine or from a given screen, coincides exactly with another series of lines issuing from the other machine or the other screen. It will be obvious that by having the lines of illumination projected upon one side of the object being photographed, identically aligned or matched with the lines projected upon the opposite side thereof, it is possible to obtain a greater degree of perfection and accuracy in sculptural reproduction than has heretofore been attained by means of photography.

The object to be reproduced is colored, if possible, with a powder (f. i. talcum powder) or other actinic covering.

I then produce a number of patterns (of cardboard, plywood or other suitable materials), the thickness of which is equal to the interval between two luminous lines and the profiles of which ordinately equal to those photographed (and eventually enlarged or reduced),—whereupon all of these patterns may be united so as to form a solid which is geometrically similar to the photographed subject or object. I obtain furthermore, by the union of the complemental patterns, a hollow solid which may directly be used as a die or form for reproduction, and the portions cut out to form the hollow part of the patterns may be used directly as a base for the plastic substance, such as for example, plaster of Paris, to produce the desired bust or form.

This process may be likened to the old method of constructing plastic topographic bodies in which the profile of the curves of level, are cut out in cardboard or other suitable materials and glued together.

The inequalities of the surfaces due to the fact that the relief of same is discontinuous are compensated by filling the steps between one profile and the other with a suitable plastic substance, such as sculptor's plaster.

The last touch of the sculptural work thus obtained is given manually by artists. For translating in marble or bronze statuary the solid reproduction thus obtained, the usual castings are effected, which need not be described.

The patterns suitably enlarged may also be used for a control when translating the clay model into a monumental work, thereby facilitating the sculptor's work.

A modification of invention may consist in giving the luminous lines a thickness equal to that of the dark lines, and considering as successive profiles all the lines of separation between a luminous and a dark line.

As a control, further photographic view taking machines 14 and 15 for permitting to record the portions which cannot be photographed by machines 1 and 2, may be used.

The photographing may also be effected with two synchronized kinematographic machines in order to select the couple of photographs most desirable for reproduction.

My above invention has been only illustrated and described by way of example, as the structural details thereof may be varied as desired within the scope of invention as defined in the appended claims.

Having now described and ascertained the nature of my said invention and in what manner the same is to be performed, I declare that what I claim is:

1. The method of preparing templates for sculptural reproduction of objects by means of photography which comprises projecting a series of lines of illumination upon an object, and making an instantaneous, photographic exposure thereof from a position at right angles to the direction of the projection of said lines of illumination.

2. The method of preparing templates for sculptural reproduction of objects by means of photography which comprises projecting light through a screen to produce alternate light and dark lines upon an object, and making an instantaneous photographic exposure thereof from a position at right angles to the direction of the projection of light.

3. The method of preparing templates for sculptural reproduction of objects by means of photography which comprises projecting a series of equidistantly spaced lines of illumination upon an object and making an instantaneous photographic exposure of said object from a position at right angles to the direction of the projection of said lines of illumination.

4. The method of preparing templates for sculptural reproduction of objects by means of photography which comprises projecting a series of vertical, equidistantly spaced lines of illumination upon opposite sides of an object and making instantaneous photographic exposures of said opposite sides from a position at right angles to the direction of the projection of said lines, preparing the positives from said exposures, reproducing the projected photographed lines upon a suitable template material and cutting out the patterns formed by said lines.

5. The method of preparing templates for sculptural reproduction of objects by means of photography which comprises projecting a series of vertical, equidistantly spaced lines of illumination upon an object and making simultaneous, instantaneous photographic exposures of said opposite sides from a position at right angles to the direction of the projection of said lines, preparing the positives from said exposures, reproducing the projected photographed lines upon a suitable template material and cutting out the patterns formed by said lines.

6. The method of preparing sculptural reproductions of objects by means of photography which comprises simultaneously projecting from co-axial projectors a series of equidistantly spaced lines of illumination upon diametrically opposite sides of the object to be reproduced, making simultaneous, instantaneous photographic exposures of said object from a position at right angles to the axes of the lens of the projectors and perpendicular thereto, preparing the positives from said photographic exposures, reproducing the projected photographed lines from said positives upon a suitable template material to form patterns, cutting out the patterns formed by said lines and forming a mold from said patterns.

7. The method of preparing templates for sculptural reproduction of objects by means of photography which comprises projecting a series of lines of illumination upon diametrically opposite sides of an object and making instantaneous, photographic exposures thereof from a position at right angles to the direction of the projection of said lines.

8. The method of preparing templates for sculptural reproduction of objects by means of photography which comprises projecting a series of lines of illumination upon diametrically opposite sides of an object and making simultaneous, instantaneous photographic exposures thereof from a position at right angles to the direction of the projection of said lines.

9. The method of preparing templates for sculptural reproduction of objects by means of photography which comprises projecting a series of identically matched lines of illumination diametrically opposite sides of an object and making simultaneous, instantaneous photographic exposures thereof, by means of cameras whose lens axes are co-planar with each other and with the axes of the projector lens, from a position at right angles to the direction of the projection of said lines.

10. The method of preparing templates for sculptural reproduction of objects by means of photography which comprises projecting a series of identically matched lines of illumination upon diametrically opposite sides of an object and making simultaneous instantaneous photographic exposures thereof from a position at right angles to the direction of the projection of said lines.

11. The method of preparing templates for sculptural reproduction of objects by means of photography which comprises projecting a series of identically matched lines of illumination upon diametrically opposite sides of an object from projectors whose lens are co-axial, making simultaneous, instantaneous photographic exposures thereof from a position at right angles to the axes of the lens of the projectors by means of cameras whose lens axes are co-planar with the axes of the projector lens, reproducing the projected photographed lines from said positives upon a suitable template material, cutting out the patterns formed by said lines and forming a mold from said patterns.

12. The method of preparing sculptural reproductions of objects by means of photography which comprises simultaneously projecting a series of lines of illumination upon diametrically opposite sides of the object to be reproduced, making simultaneous, instantaneous photographic exposures of said object from a direction at right angles to the axes of the lens of the projectors, preparing positives from said photographic exposures, reproducing the projected photographed lines from said positives upon a suitable template material to form patterns, and forming a sculptural reproduction of the object photographed upon said patterns.

13. The method of preparing sculptural reproductions of objects by means of photography which comprises simultaneously projecting a series of lines of illumination upon diametrically opposite sides of the object to be reproduced, making simultaneous, instantaneous photographic exposures of said object from a direction at right angles to the axes of the lens of the projectors, preparing positives from said photographic exposures, reproducing the projected photographed lines from said positives upon a suitable template material to form patterns, assembling the patterns so produced into a single unit roughly resembling the object photographed, and forming a sculptural reproduction of the object photographed upon said patterns.

FILIBERTO SALLIER DE LA TOUR.